(12) United States Patent
Schäufele

(10) Patent No.: US 6,799,775 B2
(45) Date of Patent: Oct. 5, 2004

(54) AIRBAG HOUSING

(75) Inventor: Erhard Schäufele, Aspach (DE)

(73) Assignee: DaimlerChrysler AG, Stuttgart (DE)

( * ) Notice: Subject to any disclaimer, the term of this patent is extended or adjusted under 35 U.S.C. 154(b) by 28 days.

(21) Appl. No.: 10/251,419

(22) Filed: Sep. 20, 2002

(65) Prior Publication Data

US 2003/0111827 A1 Jun. 19, 2003

(30) Foreign Application Priority Data

Dec. 14, 2001 (DE) .......................... 101 61 446

(51) Int. Cl.$^7$ ............................................. B60R 21/20
(52) U.S. Cl. .................... 280/728.2; 280/732
(58) Field of Search .......................... 280/728.2, 728.1, 280/732, 752

(56) References Cited

U.S. PATENT DOCUMENTS

| 5,127,669 A | * | 7/1992 | Suran et al. | ................. 280/732 |
|---|---|---|---|---|
| 5,295,707 A | * | 3/1994 | Satoh et al. | .............. 280/728.2 |
| 5,342,082 A | * | 8/1994 | Kriska et al. | ............. 280/728.2 |
| 5,405,163 A | * | 4/1995 | Amamori et al. | ......... 280/728.2 |
| 5,505,484 A | * | 4/1996 | Miles et al. | .............. 280/728.2 |
| 5,533,747 A |   | 7/1996 | Rose |   |
| 5,791,684 A | * | 8/1998 | Repp et al. | .................. 280/732 |

FOREIGN PATENT DOCUMENTS

DE   198 51 975   5/2000
JP   11-42994   2/1999

* cited by examiner

Primary Examiner—David R. Dunn
(74) Attorney, Agent, or Firm—Kenyon & Kenyon

(57) ABSTRACT

In order to provide an airbag housing that includes an airbag and a gas generator, whereby the airbag housing has a basic housing member which is deformable in response to the impact of a body part and whose open, side regions are each occluded by a side cover with the aid of connecting elements, and whereby simplified manufacturing may be achieved, at least one connecting element is supported at the side cover so as to be able to slide.

8 Claims, 1 Drawing Sheet

AIRBAG HOUSING

CROSS REFERENCE TO RELATED APPLICATIONS

The present application claims priority to Application No. 101 61 446.2, filed in the Federal Republic of Germany on Dec. 14, 2001, which is expressly incorporated herein in its entirety by reference thereto.

FIELD OF THE INVENTION

The present invention relates to an airbag housing that includes an airbag and a gas generator.

BACKGROUND INFORMATION

German Published Patent Application No. 198 51 975 describes an airbag housing that has a basic housing member for accommodating an airbag and a gas generator. An open side region, which is occluded by a side cover, is situated in the basic housing member, on both sides of it, next to an outlet orifice for the airbag.

In order to render the airbag housing compliant for the possible impact of a body, e.g. in the case of a slight accident in which the airbag is not fired, slits are introduced into the side covers, the slits extending essentially perpendicularly to the expected impact direction, so that the resistance of the side cover to deformation is reduced. The basic member can only yield in response to the action of a force, because the slots make the side covers ductile. If the airbag housing is subjected to impact, both the basic housing member and the side covers can be deformed, and therefore, injuries can be prevented.

In order to introduce the slots into the side covers, material is first punched out, and, in order to prevent the airbag from being damaged upon deployment, the edges of the slots are subsequently bent and deburred. Therefore, the introduction of slots into the side cover represents a marked increase in outlay during the manufacture of such airbag housings.

It is an object of the present invention to provide an airbag housing, which may be simpler to manufacture, while retaining advantages of the related art.

SUMMARY

The above and other beneficial objects of the present invention are achieved by providing an airbag housing as described herein.

Side covers are attached to a basic housing member by connecting elements. The present invention provides for at least one connecting element being constructed in such a manner, that it is supported so as to be movable with respect to the side covers. Since the connecting element is rigidly connected to the basic housing member, the basic housing member may be deformed in response to the impact of a body, without the side covers having to be machined in a costly manner. Therefore, the processing-intensive slots in the side cover may be dispensed with. The movable connecting elements may therefore ensure that the basic housing member may move with respect to the side covers, without compulsorily deforming the side covers as well. The movable connecting elements allow the side covers to put up almost no opposition to the movement of the basic member, so that the basic member may deform more easily. In addition, the movable connecting elements may prevent the airbag from being damaged upon deployment, since the side covers may be formed without cut-outs in the deployment region of the airbag.

When the connecting element is movably supported in a direction approximately parallel to the expected impact direction, the resistance of the side covers may be reduced in an optimum manner.

In order to provide the basic member with a deformation path in response to impact, the connecting element, along with the basic housing member, may be supported at the side cover so as to be able to slide. Apart from the sliding bearing, other connections between the basic housing member and the side covers are possible.

The connecting element may be a screw, which crosses through the side cover in a slotted hole. However, rivets, pins, etc. may also be used as connecting elements.

The slotted hole may allow the screw to be supported so as to be able to be slide in a direction corresponding to the expected direction of impact.

To stabilize the airbag housing, a fastening clip on the side cover may extend across the entire height of the basic housing member.

In order to still support the screw together with the basic housing, so as to be movable with respect to the side cover, the upper end of the fastening clip may have a slot, which is positioned so as to be coincident with the slotted hole.

In one example embodiment of the present invention, the lower end of the fastening clip may be fastened to the side cover, using a screw connection.

Further aspects and example embodiments of the present invention are explained below with reference to the drawing.

DETAILED DESCRIPTION

Figure 1:
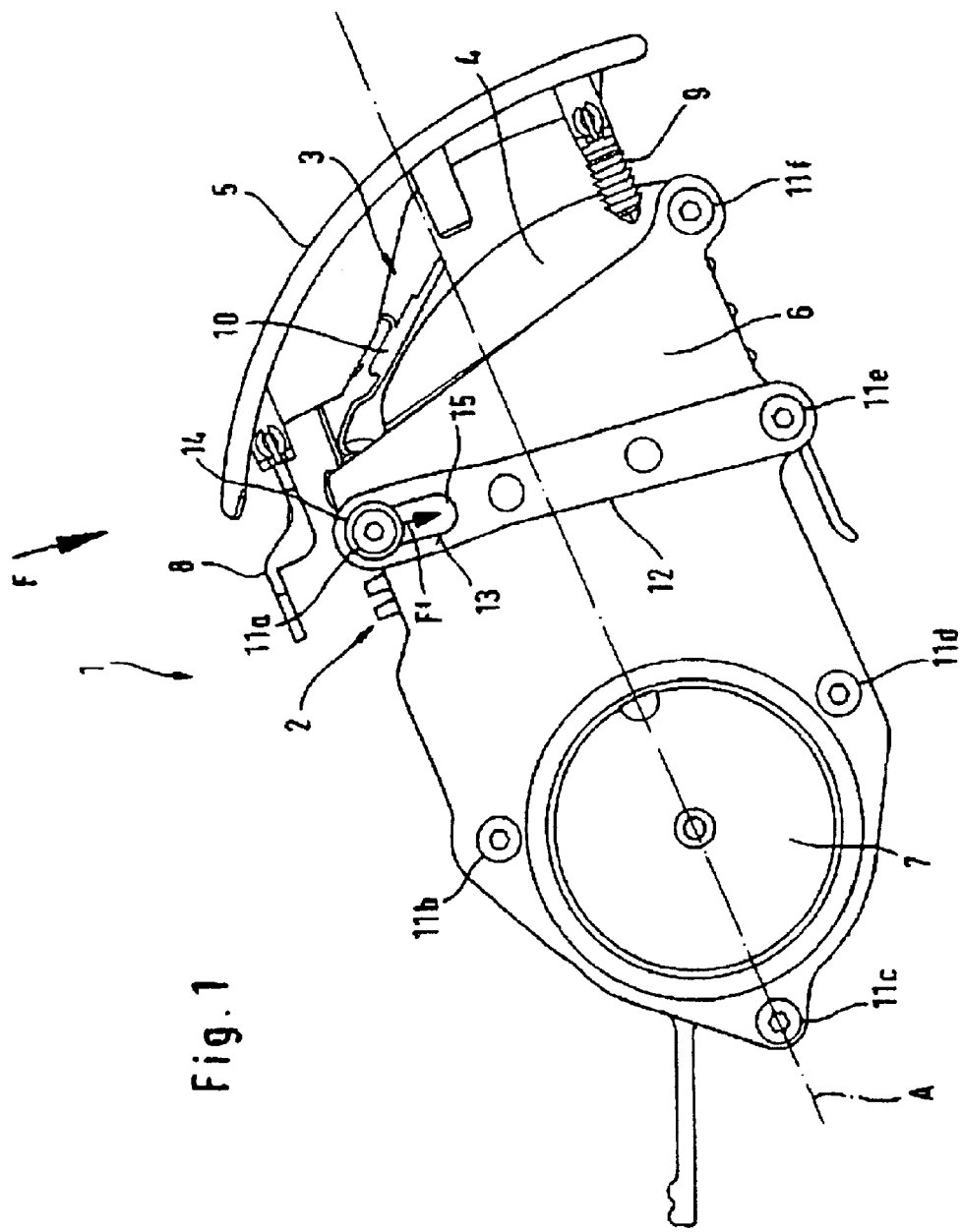
FIG. 1 is a side view of an airbag housing, which is mounted in the cockpit area of a motor vehicle, for a front-passenger-side airbag.

FIG. 1 is a side view of an airbag housing 1, which is mounted in the cockpit area of a motor vehicle, for a front-passenger-side airbag.

Airbag housing 1 is made up of a basic housing member 2, whose cross-section is approximately U-shaped, and whose outlet orifice 3 for an airbag 4 accommodate in basic housing member 2 is occluded in the direction of the vehicle interior, i.e. on its long side, by an airbag deployment door 5. Basic housing member 2, which is only partially illustrated in FIG. 1, is laterally occluded by two side covers 6, of which only one is illustrated in FIG. 1. The two side covers 6 are mounted on the side of outlet orifice 3 in a specularly symmetric manner, so that the following description also applies to the side cover 6 not illustrated in FIG. 1.

In addition to airbag 4, basic housing member 2 accommodates a gas generator 7, which extends transversely or perpendicularly to major axis A of airbag housing 1. Airbag deployment door 5 is attached to the cockpit, by anchoring elements 8, 9, and 10, which release airbag deployment door 5 during the deployment of airbag 4.

Side cover 6, whose outer contour conforms to the cross-section of basic housing 2, is connected to basic housing member 2 by screws 11a through 11f. For this purpose, basic housing member 2 has location holes or receiving bore holes, which extend approximately in parallel to the extension of gas generator 7, and are provided with an internal thread for screws 11.

In order to stabilize airbag housing 1, two screws 11a and 11e are interconnected by a fastening clip 12, which extends along the outside of side cover 6. A slotted bore hole 13 is introduced in the upper region of fastening clip 12. The screw 11a passing through slotted bore hole 13 is secured by a washer 14. Side cover 6 also has slotted hole 15, which overlaps slotted bore hole 13, and through which screw 11a passes.

If, in response to a head-on collision of the motor vehicle, a force acts on basic housing member 2 in the direction of arrow F, the movement of screw 11a in accordance with arrow F allows the basic housing member to yield or deflect to a sufficient extent. The coincident slotted holes 13 and 15 of fastening clip 12 and side cover 6, respectively, which act, in principle, as a sliding bearing for screw 11a, allow screw 11a to move. Therefore, basic housing member 2 may be deformed without side cover 6 being deformed as well.

It is also possible for the movable connection between basic housing member 2 and side cover 6 to be constructed in another manner. Thus, e.g. an elastic connection may be provided, which allows basic housing member 2 to move in relation to side cover 6. In addition, it is possible for the connecting element to be constructed so that energy may additionally be removed in response to its movement.

It is also possible to apply the principal idea to other airbags, such as side airbags or window bags. The compliance of the airbag housing may be important in the case of airbags, which are mounted outside the vehicle interior for the purpose of pedestrian impact protection.

What is claimed is:

1. An airbag housing, comprising:
    an airbag;
    a gas generator;
    connecting elements; and
    a basic housing member deformable in response to an impact of a body part, and including open, side regions each occluded by a corresponding side cover with the connecting elements;
    wherein at least one connecting element is movably supported at each corresponding side cover, the basic housing member movable with respect to the corresponding side cover at least in a region of the connecting element.

2. The airbag housing according to claim 1, wherein the connecting element is movable in a direction approximately parallel to an expected impact direction.

3. The airbag housing according to claim 1, wherein the connecting element and the basic housing member are supported slidably at the side cover.

4. The airbag housing according to claim 1, further comprising a fastening clip, which extends on the side cover across an entire height of the basic housing member.

5. The airbag housing according to claim 4, wherein a lower end of the fastening clip is attached to the side cover by a screw connection.

6. An airbag housing comprising:
    an airbag;
    a gas generator;
    connecting elements; and
    a basic housing member deformable in response to an impact of a body part, and including open, side regions each occluded by a corresponding side cover with the connecting elements;
    wherein at least one connecting element is movably supported at each corresponding side cover, the basic housing member movable with respect to the corresponding side cover at least in a region of the connecting element, and
    wherein the connecting element includes a screw, which crosses through a slotted hole in the corresponding side cover.

7. An airbag housing comprising:
    an airbag;
    a gas generator;
    connecting elements; and
    a basic housing member deformable in response to an impact of a body part, and including open, side regions each occluded by a corresponding side cover with the connecting elements;
    wherein at least one connecting element is movably supported at each corresponding side cover, the basic housing member movable with respect to the corresponding side cover at least in a region of the connecting element, and
    wherein the slotted hole is oriented in the corresponding side cover in accordance with an expected impact direction.

8. An airbag housing comprising:
    an airbag;
    a gas generator;
    connecting elements; and
    a basic housing member deformable in response to an impact of a body part, and including open, side regions each occluded by a corresponding side cover with the connecting elements;
    wherein at least one connecting element is movably supported at each corresponding side cover, the basic housing member movable with respect to the corresponding side cover at least in a region of the connecting element, and
    wherein an upper end of the fastening clip includes a slotted hole positioned to coincide with a slotted hole of the corresponding side cover.

* * * * *